United States Patent

Bellach et al.

[11] Patent Number: 5,939,686
[45] Date of Patent: Aug. 17, 1999

[54] ELECTRICAL ROTARY PUSH SWITCH

[75] Inventors: Wolfgang Bellach; Thomas Eikenberg, both of Bochum; Ernst-Wilhelm Hoffmann, Herscheid, all of Germany

[73] Assignee: Leopold Kostal GmbH & Co. KG, Ludenscheid, Germany

[21] Appl. No.: 09/035,042

[22] Filed: Mar. 5, 1998

[30] Foreign Application Priority Data

Jun. 6, 1997 [DE] Germany .......................... 197 23 482

[51] Int. Cl.$^6$ ...................................... H01H 9/00
[52] U.S. Cl. ............................. 200/61.54; 200/4
[58] Field of Search .......................... 200/4, 17 R, 11 R, 200/61.27, 61.54, 18, 335, 336, 341

[56] References Cited

U.S. PATENT DOCUMENTS

| | | | |
|---|---|---|---|
| 3,988,574 | 10/1976 | Peitsmeier | 200/61.27 |
| 5,047,600 | 9/1991 | Enari et al. | 200/61.54 |
| 5,075,519 | 12/1991 | Hayakawa | 200/61.54 |
| 5,272,290 | 12/1993 | Suzuki et al. | 200/4 |
| 5,310,974 | 5/1994 | Churchill et al. | 200/566 |
| 5,691,519 | 11/1997 | Mahr | 200/61.54 |

FOREIGN PATENT DOCUMENTS 38 02 144 C 1  6/1989  Germany ..................... H01H 19/60

*Primary Examiner*—Michael Friedhofer
*Attorney, Agent, or Firm*—Brooks & Kushmann P.C.

[57] ABSTRACT

An electrical rotary push switch includes a housing having a longitudinal axis and an actuating element mounted around the housing. The actuating element is rotatable around and longitudinally movable about the housing to define switching positions. A functional element is mounted around the housing and is coupled to the actuating element to rotate as the actuating element rotates. The functional element remains fixed in position as the actuating element longitudinally moves. A first electrical contact part is slidably held to the housing to be longitudinally movable along the housing longitudinal axis. The first contact part is coupled to the functional element such that the first contact part longitudinally moves as the actuating element rotates and remains fixed in position as the actuating element longitudinally moves. A second electrical contact part is slidably held to the housing to be longitudinally movable along the housing longitudinal axis. The second contact part is coupled to the actuating element such that the second contact part longitudinally moves as the actuating element longitudinally moves and remains fixed in position as the actuating element rotates. The contact parts contact different areas of a printed circuit board as the actuating element rotates and longitudinally moves to actuate switching functions associated with the switching positions.

15 Claims, 3 Drawing Sheets

ELECTRICAL ROTARY PUSH SWITCH

TECHNICAL FIELD

The present invention relates generally to electrical rotary push switches.

BACKGROUND ART

Electrical rotary push switches interrupt and complete electrical circuits by moving electrical contact parts disposed in the housing of the switch. It is thus possible for a user to actuate an actuating element to switch on and off a plurality of functions associated with different electrical circuits. Often such switches are part of a steering column module and are used to actuate the lighting system, and the wiper system, etc., of a motor vehicle.

DE 38 02 144 C1 discloses an electrical rotary push switch having a housing which receives movable electrical contact parts. An actuating element is mounted on the housing. The actuating element is rotatable around and longitudinally movable along the housing longitudinal axis to define switching positions. Pulling and pushing the actuating element causes it to longitudinally move. The actuating element has mechanical functional elements disposed such that the contact parts are adjusted by means of a translatory displacing movement during each actuation of the actuating element.

The contact parts of this switch are, however, designed differently and by adjusting the actuating element become displaced radially and longitudinally with respect to the housing longitudinal axis. This leads to a correspondingly large radial dimensioning of the switch. To achieve the switching functions associated with the switching positions, the contact parts are disposed between two printed circuit boards which include electrical contact parts fixedly held in the housing.

SUMMARY OF THE INVENTION

Accordingly, it is an object of the present invention to provide an electrical rotary push switch operated by a single actuating element, in such a manner that while maintaining a high degree of functionability and a particularly compact structure, all movable electrical contact parts are of a substantially identical design for manufacturing efficiency and are only longitudinally displaceable along the housing longitudinal axis to achieve switching functions associated with the switching positions.

In carrying out the above object and other objects, features, and advantages, the present invention provides an electrical rotary push switch including a housing having a longitudinal axis. An actuating element is mounted around the housing. The actuating element has cross pieces which form a control path extending concentrically around the housing's longitudinal axis. The actuating element is rotatable about the housing's longitudinal axis and is longitudinally movable along the housing's longitudinal axis to define switching positions.

A functional element is mounted around the housing between the actuating element and the housing. The functional element is coupled to the actuating element such that the functional element rotates as the actuating element rotates and remains fixed in position as the actuating element longitudinally moves. The functional element includes a helical control path.

A first electrical contact part is slidably held to the housing to be longitudinally movable along the housing longitudinal axis. The first electrical contact part has a first control journal engaged to the helical control path of the functional element for coupling the first electrical contact part to the actuating element such that the first electrical contact part longitudinally moves as the actuating element rotates and remains fixed in position as the actuating element longitudinally moves.

A second electrical contact part is slidably held to the housing to be longitudinally movable along the housing longitudinal axis. The second electrical contact part has a second control journal engaged to the concentric control path formed by the cross pieces of the actuating element for coupling the second electrical contact part to the actuating element such that the second electrical contact part longitudinally moves as the actuating element longitudinally moves and remains fixed in position as the actuating element rotates.

The contact parts contact different areas of a printed circuit board as the actuating element rotates and longitudinally moves to actuate switching functions associated with the switching positions.

The advantages accruing to the present invention are numerous. Even with a high degree of functionability, the electrical rotary push switch has overall an extremely slim, easy-to-handle contour and all electrical contact parts slidably held on the housing can be combined on a single printed circuit board and the switch can thus be manufactured in a particularly inexpensive manner.

These and other features, aspects, and embodiments of the present invention will become better understood with regard to the following description, appended claims, and accompanying drawings.

BEST MODES FOR CARRYING OUT THE INVENTION

Figure 1:
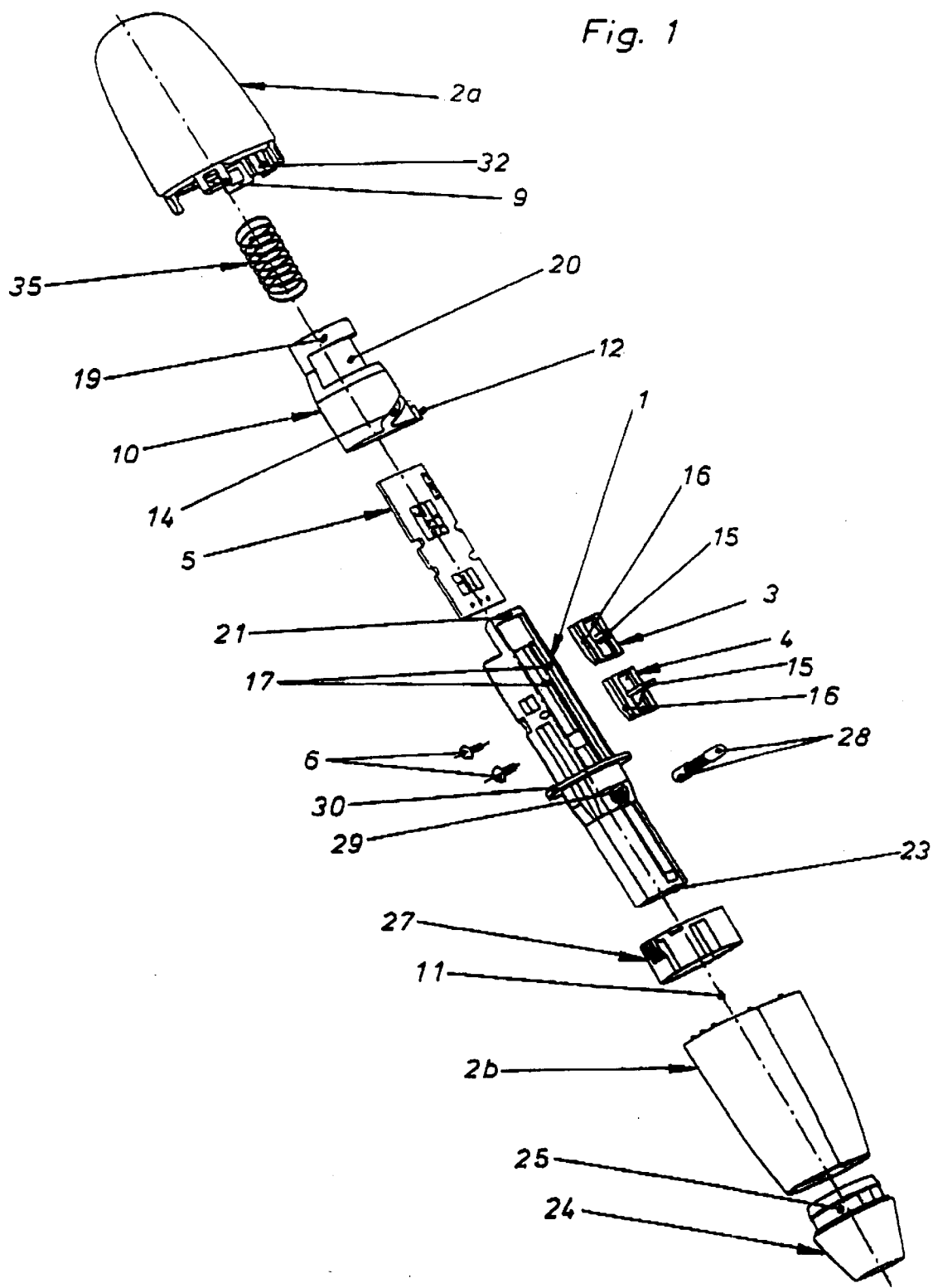
FIG. 1 illustrates an exploded perspective view of an electrical rotary push switch according to the present invention.
Figure 2:
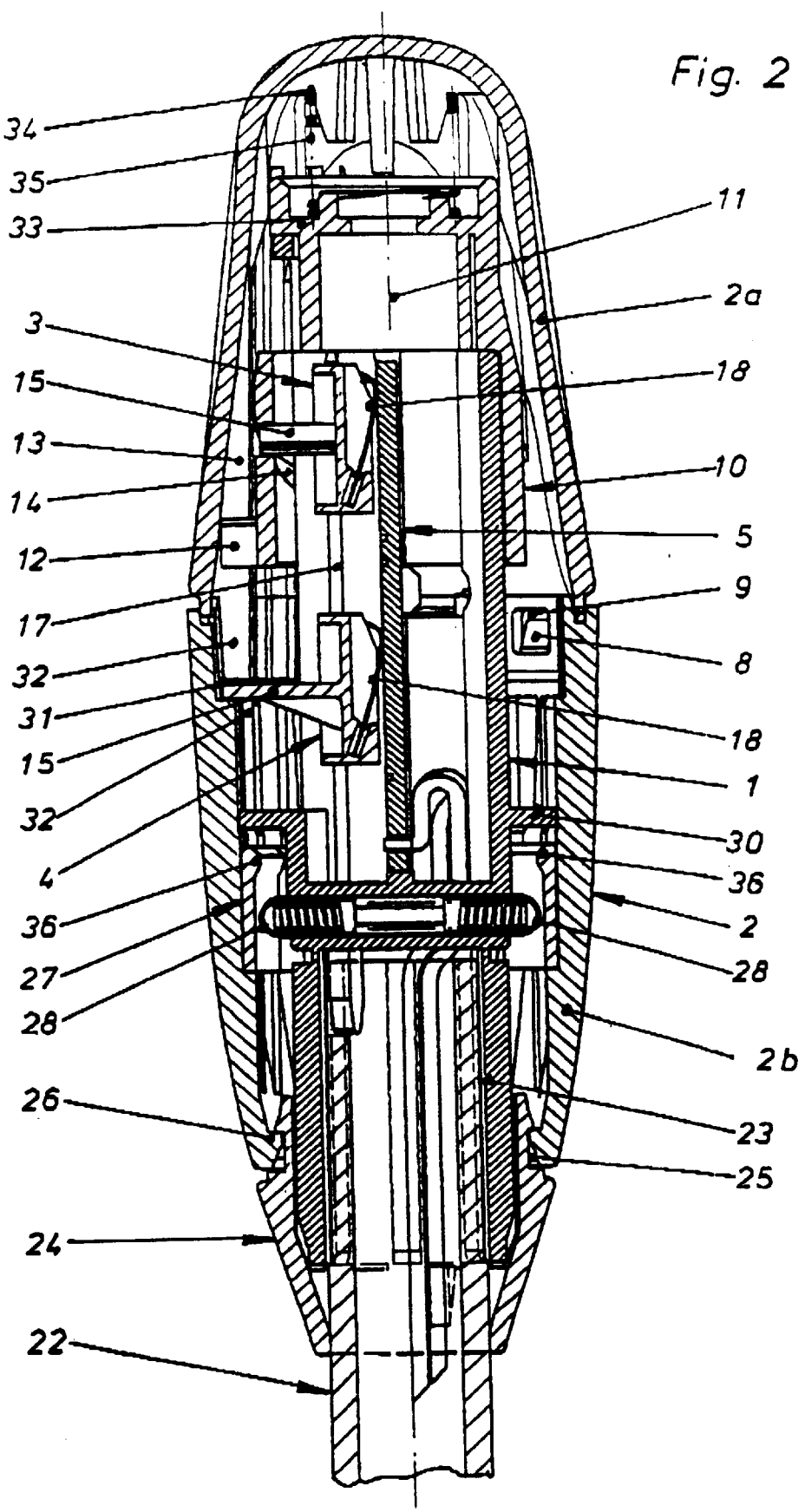
FIG. 2 illustrates a longitudinal sectional view of the switch shown in FIG. 1.
Figure 3:
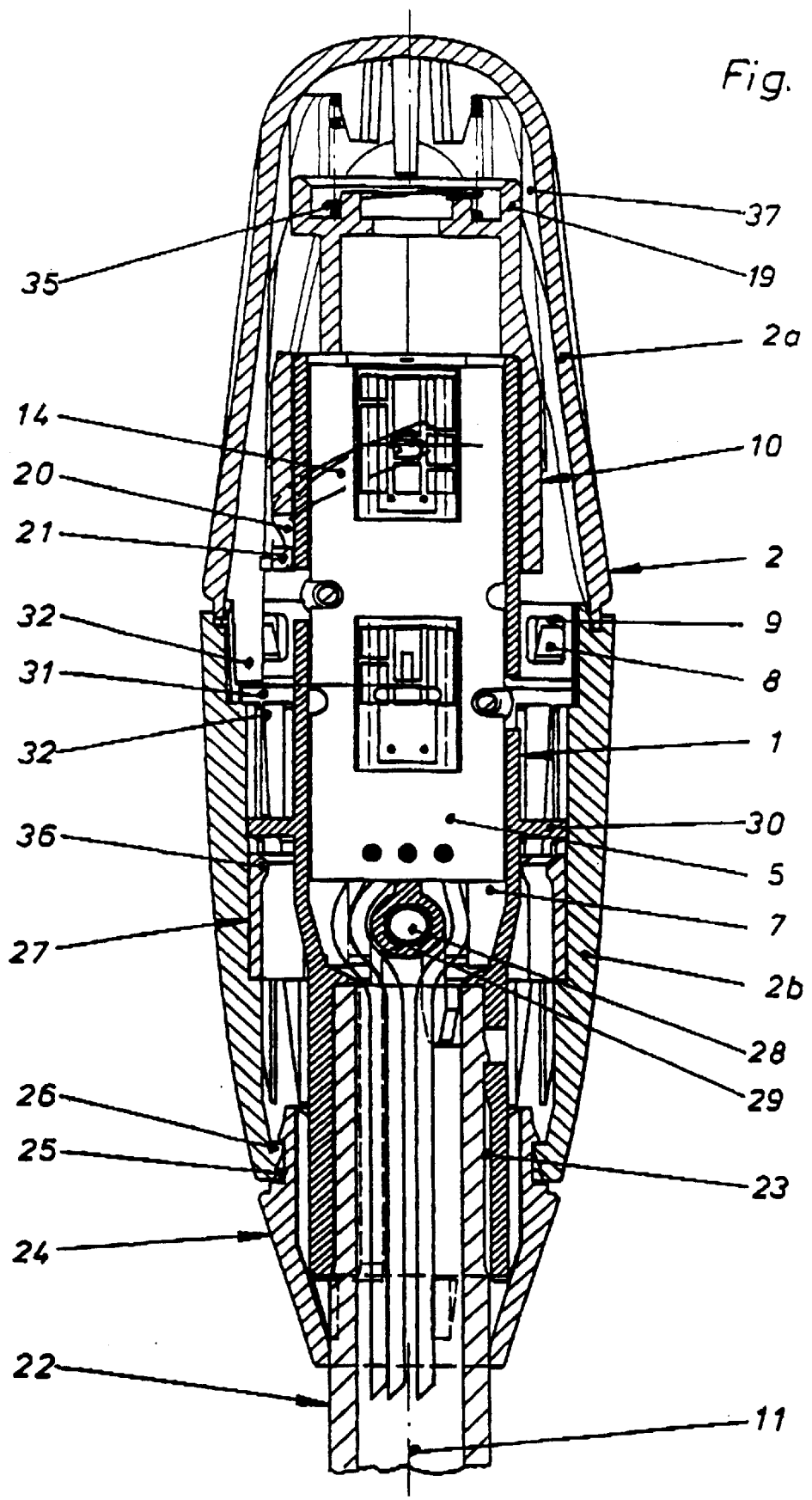
FIG. 3 illustrates a longitudinal sectional view of the switch shown in FIG. 2 rotated by 90°.

Referring now to FIGS. 1–3, an electrical rotary push switch of the present invention is shown. The switch includes a housing and an actuating element 2 mounted on a receiving body 1 of the housing. Actuating element 2 is rotatable about and longitudinally movable along a longitudinal axis 11 of the housing to move between switching positions.

The switch further includes two movable electrical contact parts 3 and 4. Electrical contact parts 3 and 4 are actuated by actuating element 2 to move and achieve switching functions associated with the switching positions. Electrical contact parts 3 and 4 are slidably held on receiving body 1 to be longitudinally movable along longitudinal axis 11. Electrical contact parts 3 and 4 contact a single printed circuit board 5 and move about the printed circuit board as actuating element 2 is actuated. Rivets 6 ensure that printed circuit board 5 remains fixed in a receiving pocket 7 of receiving body 1.

Actuating element 2 is divided into first and second actuating parts 2a and 2b. Actuating parts 2a and 2b are fixedly connected together by locking hooks 8 on the second actuating part and locking brackets 9 on the first actuating part. The two-piece design of actuating element 2, which receives in its interior all components of the switch and is designed as a human user gripping piece encompassing the components, enables a particularly convenient and inexpensive assembling process of the switch. As an encompassing gripping piece, actuating element 2 acts as a housing.

A cup-shaped functional element 10 is rotatably mounted on a free end region of receiving body 1 between actuating element 2 and the receiving body. The main surfaces forming the periphery of functional element 10 extend in parallel with longitudinal axis 11. A toothing arrangement 12 having several teeth and extending in parallel with longitudinal axis 11 is formed on the main surface of functional element 10 facing first actuating part 2a.

Toothing arrangement 12 engages a corresponding counter toothing arrangement 13 of first actuating part 2a to couple functional element 10 to the first actuating part. Functional element 10 is coupled to actuating element 2 such that the functional element rotates as the actuating element rotates. However, functional element 10 remains fixed in position as actuating element 2 longitudinally moves because toothing arrangement 12 is displaceable and slidably held in counter toothing arrangement 13 in parallel with longitudinal axis 11.

A screw-shaped helical control path 14 is formed in the periphery-forming main surfaces of functional element 10. Helical control path 14 is a slot or groove on the surface of functional element 10 which actuates first contact part 3 to longitudinally move along longitudinal axis 11 on receiving body 1 as the functional element rotates.

First contact part 3 includes a carrier or sliding carriage which has fixed on a surface-facing printed circuit board 5 an electrical contact element 18. The sliding carriage is provided with guide grooves 16 on its two lateral surfaces which engage in guide rails 17 provided on receiving body 1 to slidably hold first contact part 3 to the receiving body. A control journal 15 is on the other surface of the sliding carriage facing toward functional element 10. Control journal 15 engages helical control path 14 for coupling first contact part 3 to actuating element 2 such that the first contact part longitudinally moves as the actuating element rotates and remains fixed in position as the actuating element longitudinally moves. Thus, helical control path 14, in operative connection with control journal 15, converts the rotational movements of actuating element 2 into translatory displacing movements for first contact part 3. To insert control journal 15 into helical control path 14, the control path includes a short path portion which extends in parallel with longitudinal axis 11.

Bearing cross-pieces 37 formed on the interior wall of first actuating part 2a and extending in parallel with longitudinal axis 11 mount the first actuating part to functional element 10. Bearing cross-pieces 37 slidingly rest against a bearing ring 19 of receiving body 1. A stop bracket 21 of receiving body 1 protrudes with clearance into a stop window 20 of functional element 10 to limit the angular movement of the functional element and actuating element 2.

The housing basic body which fixedly holds on receiving body 1 is a tubular lever portion 22. To achieve a fixed connection with an attachment sleeve 23, receiving body 1 is locked on the free end region of lever portion 22 to be rotationally and longitudinally fixed in position. Receiving body 1 is designed substantially in a journal-like manner.

Actuating element 2 is mounted around receiving body 1 to be rotatable about longitudinal axis 11 and longitudinally movable along the longitudinal axis. For this purpose, second actuating part 2b—in addition to the features which relate to the mounting of first actuating part 2a—is mounted with its lower side remote from the first actuating part as to be able to rotate on a sliding piece 24 which is longitudinally displaceable on tubular lever portion 22 and on the outer wall of receiving body 1. Sliding piece 24 includes a guide groove 25 which engages sliding projections 26 formed on the lower side of second actuating part 2b.

A locking curve ring 27 is mounted to be longitudinally displaceable along longitudinal axis 11 on the outer wall of receiving body 1. Locking curve ring 27 is, however, connected in a non-rotatable and non-displaceable manner by a corresponding holding means to the inner wall of second actuating part 2b. Thus, sliding piece 24 is only simultaneously displaced into different switching positions during longitudinal movement of actuating element 2. Locking curve ring 27, however, moves between switching positions during rotational and longitudinal movement of actuating element 2.

To lockingly secure the four different switching positions achieved by a rotational displacement of actuating element 2, two locking curves are disposed mutually offset by 180° in the inner wall of locking curve ring 27. A compression spring-loaded locking element 28 engages in each of the two locking curves for securing the switching positions. For the reception purposes, in a displaceable manner the two compression spring-loaded locking elements 28 are accommodated in a receiving tunnel 29 of receiving body 1. Receiving tunnel 29 extends transverse to longitudinal axis 11. Together with a bearing projection 30 formed on receiving body 1 and sliding piece 24 held on lever portion 22, bearing cross-pieces 37 of first actuating part 2a contribute with bearing ring 19 of receiving body 1 to precisely and reliable mount actuating element 2 to the receiving body.

As a consequence of locking curve ring 27 being disposed on the inner wall of second actuating part 2b such that it can be replaced, it is possible for the adjusting angle, number of switching positions, and the locking and switching positions to be adapted conveniently for different types of electrical rotary push switches.

Furthermore, second contact part 4 is slidably held on receiving body 1 to be longitudinally movable along longitudinal axis 11. Second contact part 4 includes similar features as first contact part 3 with the exception of a control journal 15 having a flat, non-round, rectangular cross-section. Control journal 15 has a rectangular cross-section because second contact element 4 engages for its actuation into a concentric control path 31 of actuating element 2.

A plurality of cross-pieces 32 formed on the inner walls of actuating element parts 2a and 2b form concentric control path 31 which is concentric with longitudinal axis 11. Cross-pieces 32 extend at a close spaced disposition with respect to each other and in parallel with longitudinal axis 11. Cross-pieces 32 are interrupted in a groove-like manner at the same height, as a result of which concentric control path 31 is created.

Concentric control path 31 lies approximately at the height of the separation site of the two actuating parts 2a and 2b. Second contact part 4, therefore, longitudinally moves as actuating element 2 longitudinally moves. However, second contact part 4 remains fixed in position as actuating element 2 rotates owing to the concentric progression of concentric control path 31. Actuating element 2 is moved into its three switching positions to be achieved by push and pull longitudinal displacing movements.

To restore actuating element 2 into its starting switching position, a pre-stressed helical compression spring 35 is disposed between support surface 33 of functional element 10, which support surface extends transverse to longitudinal axis 11. The inner surface 34 of actuating element 2, which inner surface likewise extends transverse to the longitudinal axis. To move into the second functional switching position from the starting switching position by a push displacing movement of actuating element 2 by means of a clearly noticeable resistance (pressure point), the two locking curves of locking ring 27 include a run-up ramp 36 which cooperates with locking elements 28.

The two contact parts 3 and 4 combine to form printed circuit board 5. Printed circuit board 5 lies fixedly in a receiving pocket 7 of receiving body 1. One of the two main surfaces of printed circuit board 5 rests against receiving body 1 and the other of the two main surfaces is disposed to contact the two contact parts 3 and 4. Contact parts 3 and 4 penetrate with their contact elements 18 into a contact window provided in receiving body 1 and for achieving the different switching functions contact with their contact elements 18 the strip conductor structure of printed circuit board 5. To achieve an exact and positionally precise displacement, the two contact parts 3 and 4 are slidably held on receiving body 1 in parallel with longitudinal axis 11 by their guide grooves 16 in each case between the two guide rails 17 disposed along the contact window.

To achieve a particularly slim, easy-to-handle outer contour of actuating element 2, printed circuit board 5 extends with its main surfaces in parallel with longitudinal axis 11. For the same reason, it is also possible to displace the two contact parts 3 and 4 only longitudinally along longitudinal axis 11. Thus, the smallest possible installation space is required.

Actuating element 2 can therefore be operated in a comfortable and convenient manner. It is clearly evident to the human user by noticeable locking or pressure points, that the displaced actuating element 2 has assumed a defined switching position. The rotary push switch is attached as a functional component to the free end region of an actuating lever of a steering column switch. The steering column module therefore represents a superior operational/functional unit of a motor vehicle.

Thus, it is apparent that there has been provided, in accordance with the present invention, a an electrical rotary push switch that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An electrical rotary push switch comprising:
 a housing having a longitudinal axis;
 an actuating element mounted around the housing and having cross pieces which form a control path extending concentrically around the housing longitudinal axis, wherein the actuating element is rotatable about the housing longitudinal axis and is longitudinally movable along the housing longitudinal axis to define switching positions;
 a functional element mounted around the housing between the actuating element and the housing, the functional element coupled to the actuating element such that the functional element rotates as the actuating element rotates and remains fixed in position as the actuating element longitudinally moves, wherein the functional element includes a helical control path;
 a first electrical contact part slidably held to the housing to be longitudinally movable along the housing longitudinal axis, the first electrical contact part having a first control journal engaged to the helical control path of the functional element for coupling the first electrical contact part to the actuating element such that the first electrical contact part longitudinally moves as the actuating element rotates and remains fixed in position as the actuating element longitudinally moves;
 a second electrical contact part slidably held to the housing to be longitudinally movable along the housing longitudinal axis, the second electrical contact part having a second control journal engaged to the concentric control path formed by the cross pieces of the actuating element for coupling the second electrical contact part to the actuating element such that the second electrical contact part longitudinally moves as the actuating element longitudinally moves and remains fixed in position as the actuating element rotates; and
 a printed circuit board fixedly attached to the housing, wherein the electrical contact parts contact different areas of the printed circuit board as the actuating element rotates and longitudinally moves to actuate switching functions associated with the switching positions.

2. The switch of claim 1 wherein:
 the functional element includes a toothing arrangement and the actuating element includes a counter toothing arrangement, wherein the toothing arrangements are engaged to couple the functional element to the actuating element.

3. The switch of claim 1 wherein:
 the helical control path of the functional element comprises a groove in the surface of the functional element.

4. The switch of claim 1 wherein:
 the helical control path of the functional element comprises a slot in the surface of the functional element.

5. The switch of claim 1 wherein:
 the helical control path includes a helical control path portion and a longitudinal control path portion which extends in parallel with the housing longitudinal axis.

6. The switch of claim 1 wherein:
 the actuating element has at least two cross pieces which form the concentric control path and extend at a spaced disposition with each other concentric with the housing longitudinal axis.

7. The switch of claim 1 wherein:
 at least one of the electrical contact parts includes a carrier having the first or the second control journal on one side and an electrical contact element on the opposite side.

8. The switch of claim 7 wherein:
 the carrier includes guide grooves formed in two lateral surfaces of the carrier which are slidably held to the housing to enable the carrier to longitudinally move along the housing longitudinal axis.

9. The switch of claim 8 wherein:
 the housing includes two guide rails running along the housing longitudinal axis which receive the guide grooves to slidably hold the carrier to the housing.

10. The switch of claim 7 wherein:
the electrical contact element includes at least two contact arms and each contact arm includes a plurality of contact fingers.

11. The switch of claim 1 further comprising:
two compression spring-loaded locking elements; and
a locking curve ring provided on the actuating element, wherein the locking curve ring includes two locking curves mutually offset by 180°, wherein the locking elements engage the locking curve rings to secure the switching positions.

12. The switch of claim 1 wherein:
the actuating element is designed as a gripping piece for a human user.

13. The switch of claim 1 wherein:
the actuating element includes two actuating element parts connected to each other by locking hooks and locking brackets adjacent to the concentric control path.

14. The switch of claim 1 further comprising:
a helical compression spring disposed between the actuating element and the functional element extending transverse to the housing longitudinal axis, wherein the helical compression spring produces a resilient force to longitudinally move the actuating element to a return position after the actuating element has been longitudinally moved away from the return position.

15. An electrical rotary push steering column switch for a motor vehicle, the switch comprising:
a housing having a longitudinal axis;
an actuating element mounted around the housing and having cross pieces which form a control path extending concentrically around the housing longitudinal axis, wherein the actuating element is rotatable about the housing longitudinal axis and is longitudinally movable along the housing longitudinal axis to define switching positions;
a functional element mounted around the housing between the actuating element and the housing, the functional element coupled to the actuating element such that the functional element rotates as the actuating element rotates and remains fixed in position as the actuating element longitudinally moves, wherein the functional element includes a helical control path;
a first electrical contact part slidably held to the housing to be longitudinally movable along the housing longitudinal axis, the first electrical contact part having a first control journal engaged to the helical control path of the functional element for coupling the first electrical contact part to the actuating element such that the first electrical contact part longitudinally moves as the actuating element rotates and remains fixed in position as the actuating element longitudinally moves;
a second electrical contact part slidably held to the housing to be longitudinally movable along the housing longitudinal axis, the second electrical contact part having a second control journal engaged to the concentric control path formed by the cross pieces of the actuating element for coupling the second electrical contact part to the actuating element such that the second electrical contact part longitudinally moves as the actuating element longitudinally moves and remains fixed in position as the actuating element rotates; and
a printed circuit board fixedly attached to the housing, wherein the electrical contact parts contact different areas of the printed circuit board as the actuating element rotates and longitudinally moves to actuate switching functions associated with the switching positions.

* * * * *